(12) United States Patent
Gudupally et al.

(10) Patent No.: US 11,741,521 B2
(45) Date of Patent: Aug. 29, 2023

(54) AUTOMATIC STRATEGIC UPDATES OF A CONTENT CATALOG USING CONTENT PROVIDER RANKINGS AND CONFIDENCE SCORING

(71) Applicant: Walmart Apollo, LLC, Bentonville, AR (US)

(72) Inventors: Shashank Reddy Gudupally, Sunnyvale, CA (US); Bala Srinivas Pillarisetty, Milpitas, CA (US); Omar Saeed Siddiqui, Sunnyvale, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 601 days.

(21) Appl. No.: 16/295,826

(22) Filed: Mar. 7, 2019

(65) Prior Publication Data
US 2020/0286147 A1 Sep. 10, 2020

(51) Int. Cl.
*G06Q 30/0601* (2023.01)
(52) U.S. Cl.
CPC ..... *G06Q 30/0627* (2013.01); *G06Q 30/0603* (2013.01)
(58) Field of Classification Search
None
See application file for complete search history.

(56) References Cited

U.S. PATENT DOCUMENTS 8,386,321 B2 * 2/2013 Grant ................. G06F 16/9558
705/14.49
8,463,810 B1 6/2013 Rennison
2008/0033915 A1 2/2008 Chen et al.
(Continued)

OTHER PUBLICATIONS

K. F. Yeung and Y. Yang, "A Proactive Personalized Mobile News Recommendation System," 2010 Developments in E-systems Engineering, 2010, pp. 207-212, doi: 10.1109/DeSE.2010.40., (Year: 2010).*

*Primary Examiner* — Michelle T Kringen
(74) *Attorney, Agent, or Firm* — BRYAN CAVE LEIGHTON PAISNER LLP

(57) ABSTRACT

A method including providing a content catalog for items. The content catalog can include attributes for the items, values associated with the attributes, content provider identifiers of content providers that provided the values, and confidence scores for the values. The method also can include tracking source rankings for the content providers for item categories. The method additionally can include receiving a new value associated with an attribute of the attributes for an item of the items. The new value can be provided by a content provider of the content providers. The method further can include generating a priority score for the new value based on a set of input features associated with the new value and a set of score weightings associated with the set of input features. The set of input features can include (a) a source ranking of the source rankings for the content provider for an item category of the item categories associated with the item and (b) a confidence score for the new value. The method additionally can include overriding an existing value of the values in the content catalog associated with the attribute with the new value based on a comparison of the priority score for the new value exceeding a priority score for the existing value. Other embodiments are disclosed.

20 Claims, 5 Drawing Sheets

(56) References Cited

U.S. PATENT DOCUMENTS

| | | | |
|---|---|---|---|
| 2011/0264598 A1* | 10/2011 | Fuxman | G06Q 30/0281 |
| | | | 705/343 |
| 2014/0304104 A1* | 10/2014 | Ladue | G06Q 30/0631 |
| | | | 705/26.7 |
| 2015/0234810 A1* | 8/2015 | Bostick | G06F 40/40 |
| | | | 704/9 |
| 2015/0294377 A1* | 10/2015 | Chow | G06Q 30/0263 |
| | | | 705/347 |
| 2016/0378768 A1 | 12/2016 | Iwasa et al. | |
| 2018/0113867 A1 | 4/2018 | Erpenbach et al. | |
| 2019/0347700 A1* | 11/2019 | Shariff | G06Q 10/0635 |

* cited by examiner

AUTOMATIC STRATEGIC UPDATES OF A CONTENT CATALOG USING CONTENT PROVIDER RANKINGS AND CONFIDENCE SCORING

TECHNICAL FIELD

This disclosure relates generally to automatic strategic updating of a content catalog using content provider rankings and confidence scoring.

BACKGROUND

Various content, such as attributes and values about items, can be provided by various different content providers. Some of the content provided by the content providers can be inaccurate or not highly relevant to the item. Updating the content catalog with such inaccurate or irrelevant content can be undesirable.

BRIEF DESCRIPTION OF THE DRAWINGS

To facilitate further description of the embodiments, the following drawings are provided in which.

Figure 1:
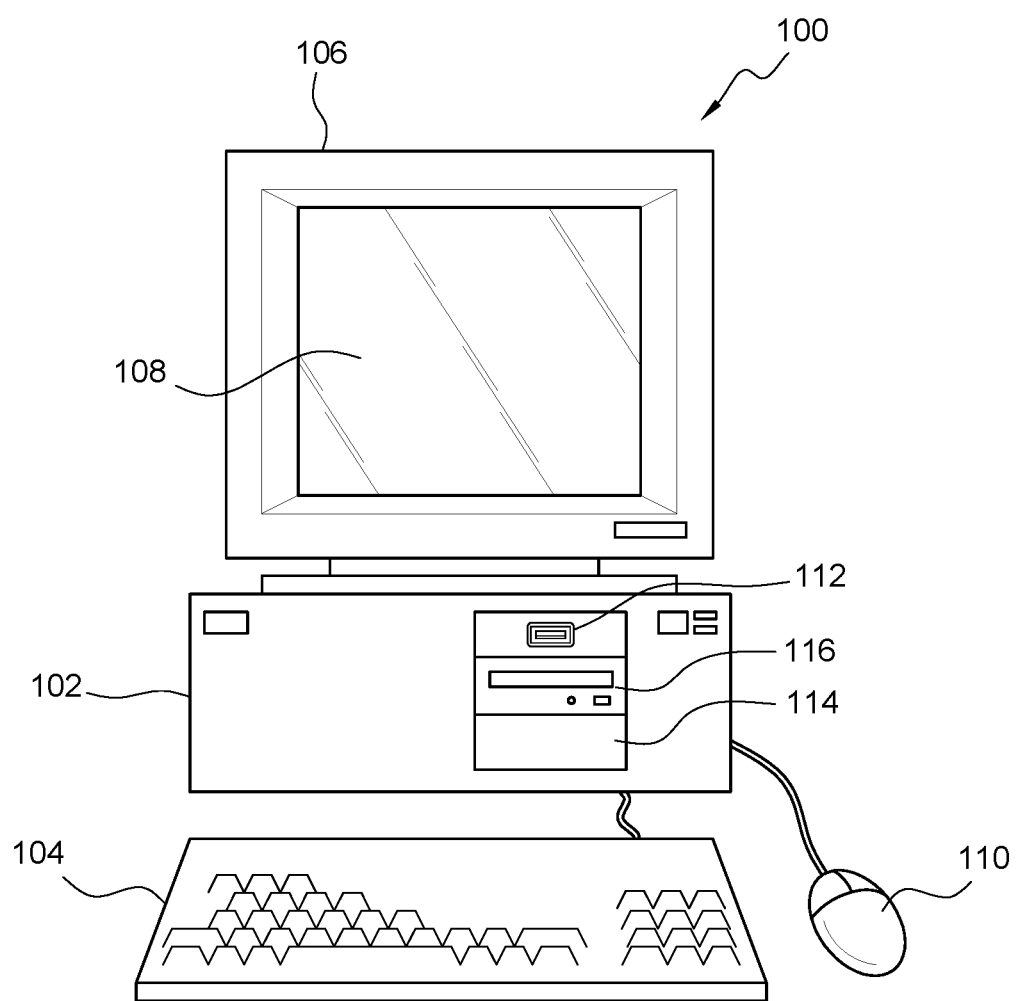
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Figure 2:
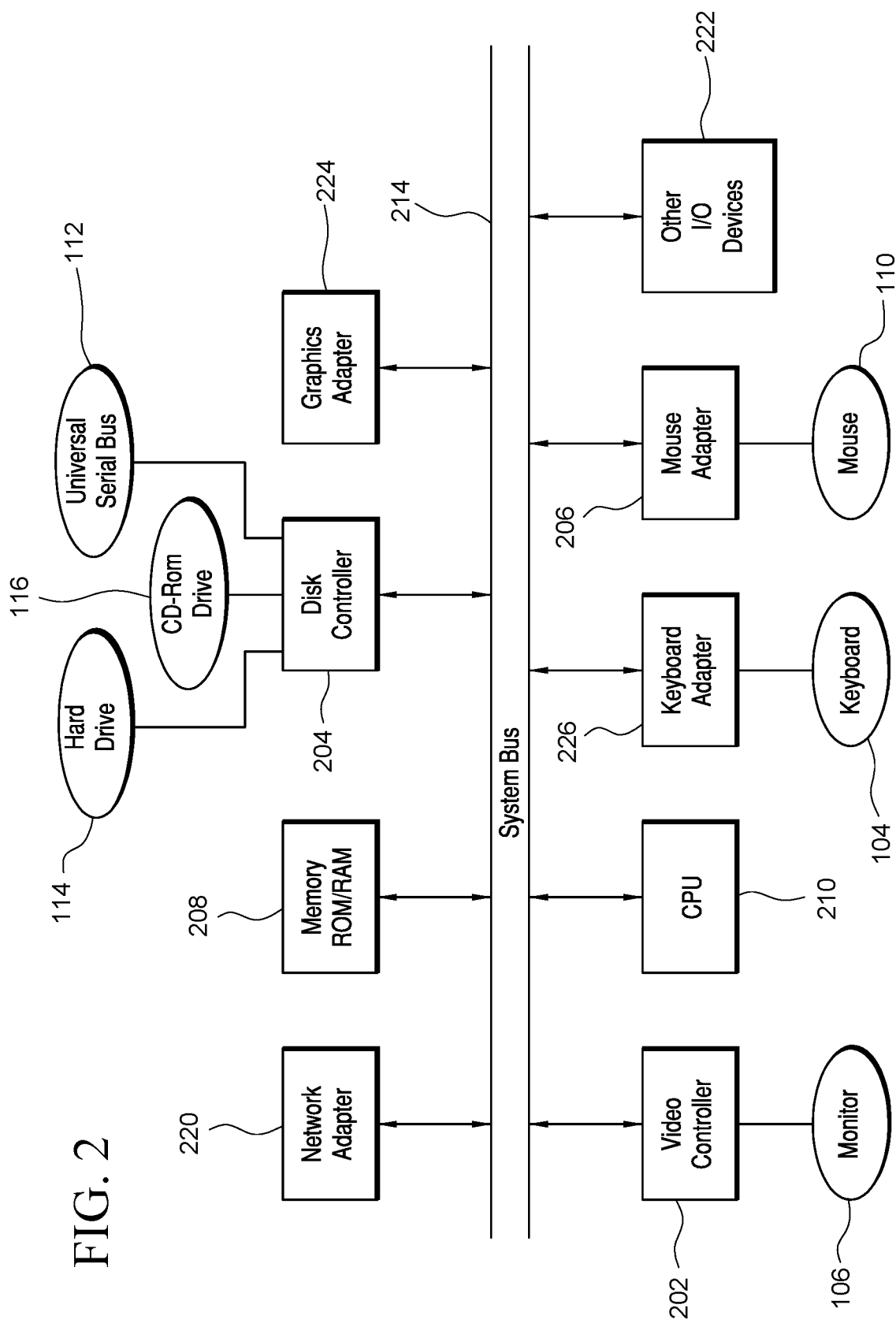
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can includes one or more of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 100) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
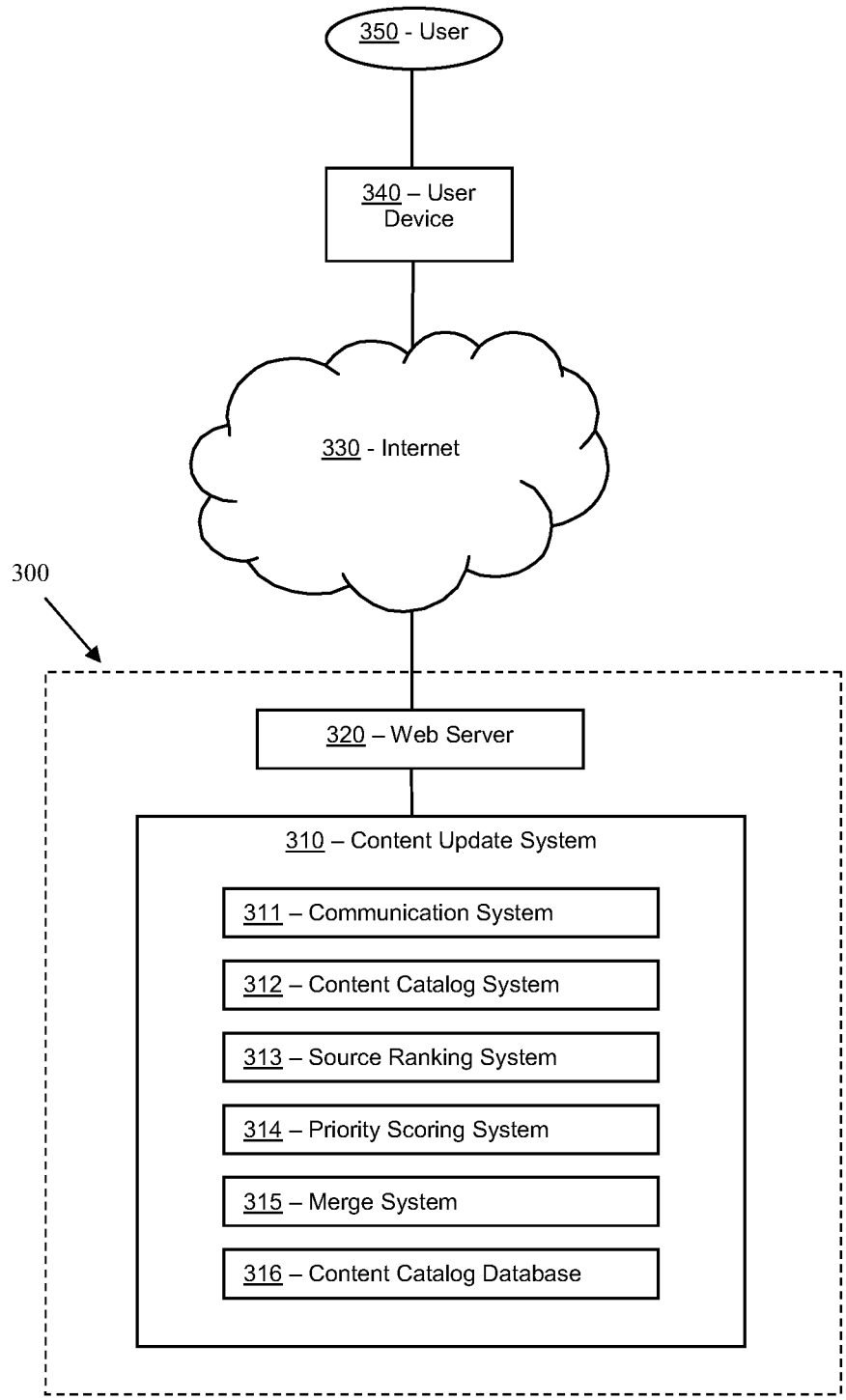
FIG. 3 illustrates a block diagram of a system that can be employed for automatic strategic updates of a content catalog using content provider rankings and confidence scoring, according to an embodiment.

Turning ahead in the drawings, FIG. 3 illustrates a block diagram of a system 300 that can be employed for automatic strategic updates of a content catalog using content provider rankings and confidence scoring, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. In some embodiments, system 300 can include a content update system 310 and/or web server 320.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Content update system 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host content update system 310 and/or web server 320. Additional details regarding content update system 310 and/or web server 320 are described herein.

In some embodiments, web server 320 can be in data communication through Internet 330 with one or more user devices, such as a user device 340. In some embodiments, user device 340 can be used by users, such as a user 350. In many embodiments, web server 320 can host one or more websites and/or mobile application servers. For example, web server 320 can host a website, or provide a server that interfaces with a mobile application, on user device 340, which can allow users to browse and/or search for items (e.g., products), to add items to an electronic cart, and/or to purchase items, in addition to other suitable activities.

In some embodiments, an internal network that is not open to the public can be used for communications between content update system 310 and web server 320 within system 300. Accordingly, in some embodiments, content update system 310 (and/or the software used by such systems) can refer to a back end of system 300 operated by an operator and/or administrator of system 300, and web server 320 (and/or the software used by such systems) can refer to a front end of system 300, as is can be accessed and/or used by one or more users, such as user 350, using user device 340. In these or other embodiments, the operator and/or administrator of system 300 can manage system 300, the processor(s) of system 300, and/or the memory storage unit(s) of system 300 using the input device(s) and/or display device(s) of system 300.

In certain embodiments, the user devices (e.g., user device 340) can be desktop computers, laptop computers, a mobile device, and/or other endpoint devices used by one or more users (e.g., user 350). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can include a mobile device, and vice versa. However, a wearable user computer device does not necessarily include a mobile device, and vice versa.

In specific examples, a wearable user computer device can include a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can include (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can include the Virtual Retinal Display™ product, or similar product by the University of Washington of Seattle, Wash., United States of America. Meanwhile, in further specific examples, a limb mountable wearable user computer device can include the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, content update system 310 and/or web server 320 can each include one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to content update system 310 and/or web server 320 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of content update system 310 and/or web server 320. In a similar manner, the processors and/or the non-transitory computer-readable media can be local and/or remote to each other.

Meanwhile, in many embodiments, content update system 310 and/or web server 320 also can be configured to communicate with one or more databases, such as a content catalog database 316. The one or more databases can include a product database that contains information about products, items, or SKUs (stock keeping units), for example. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, content update system 310, web server 320, and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, content update system 310 can include a communication system 311, a content catalog system 312, a source ranking system 313, a priority scoring system 314, a merge system 315, and/or content catalog database 316. In many embodiments, the systems of content update system 310 can be modules of computing instructions (e.g., software modules) stored at non-transitory computer readable media that operate on one or more processors. In other embodiments, the systems of content update 310 can be implemented in hardware. Content update system 310 and/or web server 320 each can be a computer system, such as computer system 100 (FIG. 1), as described above, and can be a single computer, a single server, or a cluster or collection of computers or servers, or a cloud of computers or servers. In another embodiment, a single computer system can host content update system 310 and/or web server 320. Additional details regarding content update system 310 the components thereof are described herein.

Figure 4:
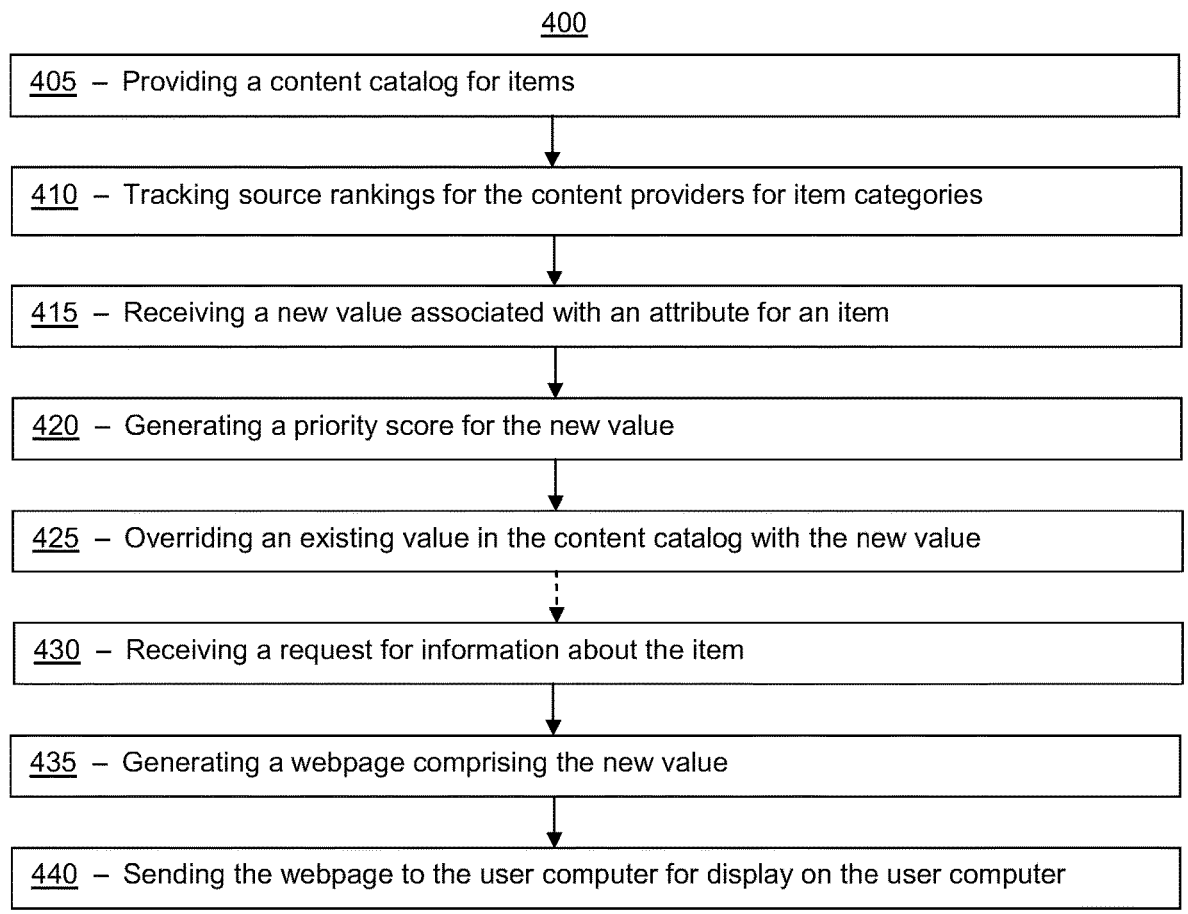
FIG. 4 illustrates a flow chart for a method, according to an embodiment.

Turning ahead in the drawings, FIG. 4 illustrates a flow chart for a method 400, according to an embodiment. In some embodiments, method 400 can be a method of providing automatic strategic updates of a content catalog using content provider rankings and confidence scoring. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped.

In many embodiments, system 300 (FIG. 3), content update system 310 (FIG. 3), and/or web server 320 (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of system 300. The processor(s) can be similar or identical to the processor(s) described above with respect to computer system 100 (FIG. 1).

In some embodiments, method 400 and other blocks in method 400 can include using a distributed network including distributed memory architecture to perform the associated activity. This distributed architecture can reduce the impact on the network and system resources to reduce congestion in bottlenecks while still allowing data to be accessible from a central location.

Referring to FIG. 4, method 400 can include a block 405 of providing a content catalog for items. In many embodiments, the content catalog can be stored in a database, such as content catalog database 316 (FIG. 3). In several embodiments, content catalog system 312 (FIG. 3) can be used to retrieve and/or store data to content catalog database 316 (FIG. 3). In a number of embodiments, the content catalog can include items and information about the items. In many embodiments, the content catalog can include attributes for the items, values associated with the attributes, content provider identifiers of content providers that provided the values, confidence scores for the values, and/or other suitable information about the item.

For example, an item in the catalog can be a particular type of iPhone. The item can be stored in the catalog with an attributes and values that describe information about the item. For example, for the iPhone, an attribute "manufacturer" can have the value "Apple," an attribute "model name" can have the value "iPhone XS," an attribute "color" can have the value "black," etc. In many embodiments, each item can be categorized into an item category. For example, the iPhone can be categorized into the "cell phones" item category. In many embodiments, the attributes and values can be stored in a Product Canonical Form (PCF), which can be an organized structure (e.g., a JSON structure or XML structure) of the attributes and values associated with the attributes. As a further example, another value can be "Welcome to the big screens. Super Retina displays on iPhone XS deliver the most accurate color in the industry, HDR, and true blacks," which can be associated with an attribute "short description." This value can be stored in the product catalog for the iPhone item along with the attribute, a content provider identifier, a confidence score, a timestamp of a latest update, a quality score, an offer status, and/or other suitable information.

In some embodiments, the content provider identifier can identify the content provider that provided the content, such as the attribute and value information. The content provider can also be referred to as the "source" of the content. In some cases, the content provider can be a machine, such as a machine learning algorithm, which can generate the content in a convention attribute extraction process. In other cases, the content provider can be a human, such as a category specialist at an entity that provides web server 320 (FIG. 3). In yet other cases, the content provider can be a seller of the item, such as the manufacturer and/or a vendor. In many embodiments, each record in the content catalog for an attribute and value pair can include the content provider identifier for that information.

In several embodiments, the confidence score can be a measure of confidence in the accuracy of the value information. In some embodiments, the confidence score can be a number between 0 and 1, with higher values representing higher confidence. For example, when a category specialist enters information about an item, the category specialist can be unsure about the value information, and can set the confidence score to 0.5. In other cases, the category specialist can be very confident about the value information, and can set the confidence score to 0.8 or 0.9, for example. In some cases, the category specialist can enter whether the category specialist has high confidence or low confidence in the information provided, which can be translated into a confidence score. In yet other cases, a machine learning algorithm, such as an attribute extraction algorithm, can generate a confidence score to indicate the likelihood that a certain piece of content generated by the algorithm is accurate. In some cases, a category specialist can review the information generated by the machine learning algorithm to check the information for validity, which can involve the category specialist raising or lowering the confidence score when the machine-generated content is accurate or not accurate, respectively. In many cases, external content sources, such as vendors, do not provide confidence scores, so the confidence score when the content is provided by an external content source can be set to a default value, such as 0.7, 0.8, 0.9, 1.0, or another suitable value. By using confidence scores, category specialists can enter information or which they are not sure, and vendors can be able to update and override the information. In many embodiments, each record in the content catalog for an attribute and value pair can include the confidence score for that information.

In a number of embodiments, the timestamp of the latest update can be a date and time that the value for an attribute has been last updated. For example, the "color" attribute can be originally set to "black," and then later set to "matte black." The timestamp can indicate when the value was update to "matte block." The timestamp can be used to determine the age of the value information. In some cases, older information can become less accurate or less relevant than newer information. In many embodiments, each record in the content catalog for an attribute and value pair can include the timestamp for the latest update of the value.

In several embodiments, the quality score can be a measure of how relevant the content is for the item. For example, for the iPhone item, there can be a "description" attribute with a value that describes the Apple Watch and mentions that the Apple Watch can interface with an iPhone. This description can be very accurate, so it can have a high confidence score, but it is not very relevant to the iPhone item, despite its accuracy, so it can be given a low quality score. The quality score can be provided by human, such as quality specialists, or machines, such as through conventional machine leaning approaches. In many embodiments, each record in the content catalog for an attribute and value pair can include the quality score for the value.

In a number of embodiments, the offer status can be a Boolean value that indicates whether the content was provided by a content provider that is selling the item associated with the content. For example, if a vendor of the iPhone provided content, the offer status can indicate that content provider is selling the item. If a machine leaning algorithm or a category specialist provided the information, the offer status can indicate that the content provider is not selling the item. Content providers that are selling an item can have more accurate information about the item. In many embodiments, each record in the content catalog for an attribute and value pair can include the offer status for the value.

In several embodiments, method 400 also can include a block 410 of tracking source rankings for the content providers for item categories. In many embodiments, each content provider can be assigned a source ranking. In some embodiments, the source ranking for a content provider can be the same for any content provided by the content provider, even for content associated with different item categories. In other embodiments, the source ranking for a content provider can be different for different item categories. In many embodiments, the source rankings can be stored in a database.

For example, if the content provider is a shoe manufacturer, such as Nike, and the item category is shoes, the source ranking can be high, indicating that the content provider is trusted for providing good content (e.g., accurate, relevant content). If the content provider is a small retail vendor that sells Nike shoes, the source ranking for the item categories of shoes for the small retail vendor can be lower than the source ranking for Nike. Category specialists and/or machine learning algorithms can have source rankings as well.

In some embodiments, if a content provider does not have a source ranking for a particular item category, the source ranking for the item category can be determined based on the source ranking for the content provider in a different item category that is similar to the particular item category. For example, if the particular item category and the different item category are under the same subcategory in a taxonomy of item categories, the source ranking of the different item category can be used for the particular item category, or can be discounted by a default amount. For each level up the taxonomy that is traversed in order to find a common category, sub-department, or department node under which both the particular item category and the different item category exist, an additional discount can be applied to the source ranking, as the particular item category and the different item category are more remote from each other. If the root of the tree is the common node between the particular item category and the different item category, or there are no existing source rankings for the content provider, a default source ranking can be used for the content provider.

In many embodiments, the source rankings can be determined based on volumes or sales, amount of content provided, accuracy of content provided, relevance of content provided, and/or other suitable factors. In many embodiments, the source rankings can be static. In other embodiments, the source rankings can be dynamic, based on changes in the factors described above. In some embodiments, the source rankings can be updated manually through an application programming interface (API), which can allow category specialists or others to update a source ranking. For example, the source ranking from a particular attribute extraction machine learning algorithm can be set to a certain source ranking.

In some embodiments, a subset of the content providers can be grouped together in a first group, and the source ranking for each of the content providers in the first group can be identical for a first item category of the item categories. For example, each of the large shoe manufacturers can be categorized in a group of large shoe manufacturers, and the source ranking of each of these content providers in the shoe item category can be set to a particular source ranking, such as a high source ranking.

In various embodiments, each content provider can have a content provider identifier, which can be a unique organization identifier ("org_id"). The organization identifier can be used to identify the content provider and to lookup the source ranking for the content provider. In some cases, a content provider, such as a trusted vendor with a high source ranking, can desire to provide content under a different organization identifier without the high source ranking. For example, a trusted shoe vendor can enter information for which the vendor is unsure under a different organization identifier, such that the information will not be treated with the same level of trust.

In a number of embodiments, method 400 additionally can include a block 415 of receiving a new value associated with an attribute of the attributes for an item of the items. In many embodiments, the new value can be provided by a content provider of the content providers. For example, the attribute of "color" for the iPhone item can be originally set to a value of "black," and a content provider provide content that lists the value as "matte black" for the "color" attribute. This new information might be accurate or not accurate, as indicated by the confidence score; might be relevant or not relevant, as indicated by the quality score; might come from a content provider that is trusted or not trusted, as indicated by the source ranking for the content provided; might come from a content provider that is selling or is not selling the item, as indicated by the offer status; etc. In order to automatically evaluate the new value and determine whether to override the original value with the new value, priority scoring process can be used, as described below in further detail.

In several embodiments, the new value can be received as part of a set of new and/or updated values for an item, and/or can be part of updates to one or more items. For example, a content provider, such as a manufacturer, a vendor, a category specialist, or a machine leaning algorithm, can provide new and/or updated values for one or more items. In some embodiments, the content received can be in the PCF, such as in an organized JSON or XML structure. In many embodiments, despite multiple values being received in an update, each individual value can be handled separately, such as one or more of the new values in the set of new values can be used to override existing data, when one or more other new values in the set of new values are not used to override existing data. In other embodiments, each of the new values in a set of new values can be grouped and handled as a group, such that each of the new values of the group are assigned a common priority score, as described below in block 420.

In some embodiments, the source ranking for the content provider associated with the item category can be different from a second source ranking of the source rankings for the content provider associated with a second item category of the item categories, when the second item category is different from the item category. As described above, the source ranking for content providers can be different for different item categories. In certain embodiments, the content provider for the new value can be a seller of the item, such as a vendor. In other embodiments, the content provider for the new value can be a machine learning algorithm that generated the new value. In still other embodiments, the content provider for the new value can be a category specialist.

In several embodiments, method 400 further can include a block 420 of generating a priority score for the new value based on a set of input features associated with the new value and a set of score weightings associated with the set of input features. In many embodiments, the set of input features can include (a) a source ranking of the source rankings for the content provider for an item category of the item categories associated with the item and (b) a confidence score for the new value. In some embodiments, the set of input features further can include an offer status of the new value, a timestamp or age of at latest update of the new value, and a quality score of the new value. In certain embodiments, the set of input features also can include other suitable features related to the new value, the item, and/or the content provider providing the new value.

In a number of embodiments, the set of input features can be used as inputs to priority scoring system 314 (FIG. 3). In several embodiments, priority scoring system 314 (FIG. 3) can make calls to other systems, such as source ranking system 313 (FIG. 3) to determine the source ranking for the content provider. For generating the priority score for new values, priority scoring system 314 (FIG. 3) can use the new value received. For generating the priority score for existing values, priority scoring system 314 (FIG. 3) can retrieve one or more records in the content catalog associated with the existing values.

In many embodiments, the set of score weightings can be used in conjunction with the set of input features to determine the priority score. The weightings can indicate the weight or importance of each of the input features. In some embodiments, certain of the weightings in the set of score weightings can be greater than other weightings. For example, in some embodiments, a first weighting of the set of score weightings associated with the source ranking and a second weighting of the set of score weightings associated with the confidence score can each be greater than a third weighting of the set of score weightings associated with the offer status. The third weighting of the set of score weightings associated with the offer status can be greater than each of a fourth weighting of the set of score weightings associated with the timestamp and a fifth weighting of the set of score weightings associated with the quality score. In other embodiments, different weightings can be used.

In several embodiments, the priority score can be generated as follows:

$$PS = \sum_f v_f \times w_f,$$

where PS is the priority score, $v_f$ is the value associated with input feature f, and $w_f$ is the weighting use for input feature f. In some embodiments, the priority score can be a value between 0 and 1, such as 0.78.

Figure 5:
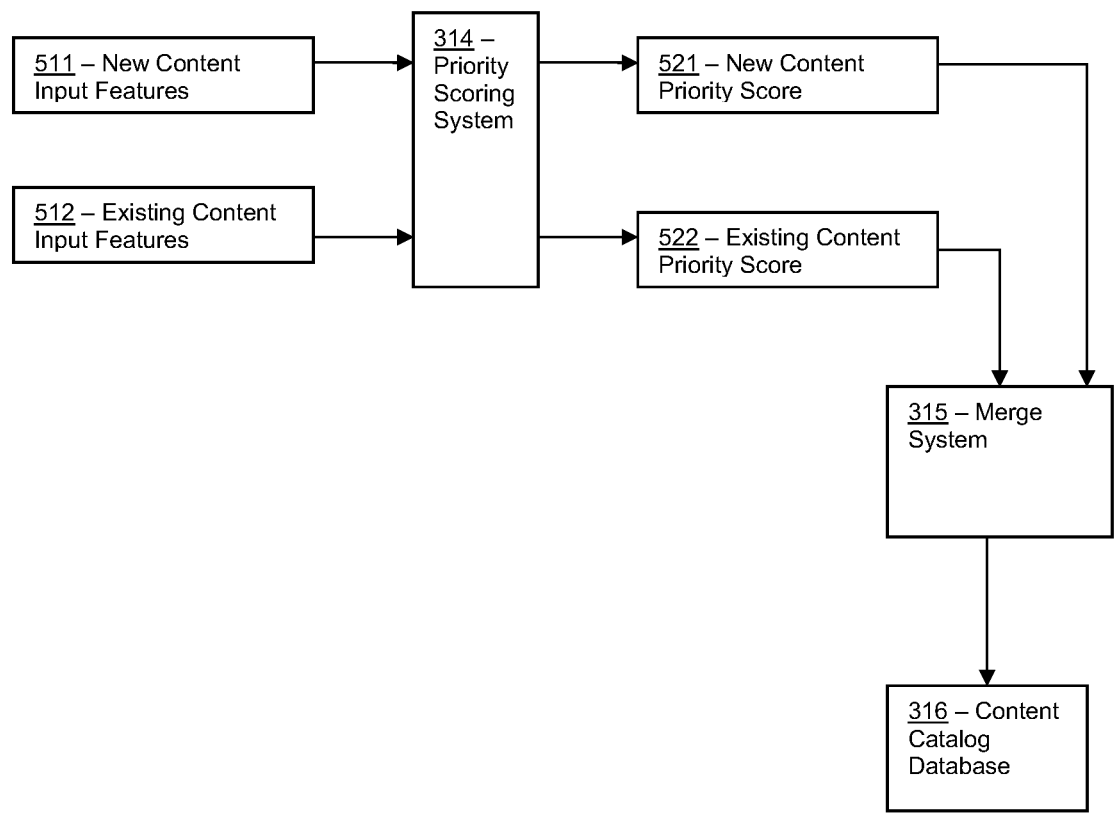
FIG. 5 illustrates a block diagram showing a flow of data with respect to various systems of the content update system of FIG. 3.

Turning ahead in the drawings, FIG. 5 illustrates a block diagram 500 showing a flow of data with respect to various systems of content update system 310 (FIG. 3). The flow of data shown in FIG. 5 is merely exemplary and is not limited to the embodiments presented herein. The flow of data can be employed performed in many different embodiments or examples not specifically depicted or described herein.

As shown in FIG. 5, new content input features 511 and existing content input features 512 can be input into priority scoring system 314. New content input features 511 can be set of input features associated with the new value, and existing content input features 512 can be a set of input features associated with an existing value that has the same attribute for the same item as the new value.

In many embodiments, priority scores can be generated by priority scoring system 314 based these inputs (e.g., 511, 512). Specifically, a new content priority score 521 can be generated by priority scoring system 314 based on new content input features 511, and an existing content priority score 522 can be generated by priority scoring system 314 based on existing content input features 512.

In several embodiments, these priority scores (e.g., 521, 522) can be fed into merge system 315, which can determine whether to override the existing content with the new content in content catalog database 316, or to retain the existing content in content catalog database 316, as described below with respect to block 425 of FIG. 4.

Returning to FIG. 4, in a number of embodiments, method 400 additionally can include a block 425 of overriding an existing value of the values in the content catalog associated with the attribute with the new value based on a comparison of the priority score for the new value exceeding a priority score for the existing value. The priority score for the existing value can be determined similarly to the priority score for the new value. In many embodiments, the priority score for the existing value can be generated on the close in time (e.g., during the same day, same hour, same minute, same second, etc.) as the comparison is performed. The priority score for an existing value thus can change over time, as the value ages, the source ranking for the content provider changes, the confidence score changes, etc. When the priority score for the new value exceeds the priority score for the existing value, the new value can replace the existing value in the content catalog. When the priority score for the new value does not exceed the priority score for the existing value, the existing value can be retained in the product catalog. The process of determining whether to overriding or not overriding existing values with new values can be referred to a "merging," as some of the new values are "merged" into content catalog.

To illustrate, as an example, if the specific iPhone item described above had an attribute of "color" and value of "black" stored in an existing record in the content catalog, and the priority score generated for this existing record is 0.71, and a new value of "matte black" for the "color" attribute is received, and the priority score generated for the new value is 0.78, the record can be updated to replace the "black" value with the "matte black" value. In many embodiments, each value can be handled separately, such that for a set of new values received from a content provider, some of the new values can override existing values while other new values do not override existing values. In many embodiments, each update, each decision not to update, each of the attributes, values, set of input features, and/or the priority scores used in the comparison can be logged.

In many embodiments, the content catalog can be used by various "downstream" systems that access and/or information about the items. For example, a Shelf system can retrieve content in the content catalog about items in a category, and display that information in various configurations on a webpage. To illustrate, when a user views a "shoes" category on the website provided by web server 320 (FIG. 3), items that have an item category of shoes can be shown based on the different attributes, such as size, color, style, etc., and the values associated with those attributes. As another example, a Facets system can retrieve content in the content catalog in order to provide filtering functionality on webpages, such as filtering by size, brand, price, etc. As yet another example, a Base Variance (BV) system can retrieve content in the catalog to determine multiple attributes to display together on a webpage, such as displaying red color shirts and the sizes of such shirts that are available on the same webpage.

In several embodiments, method 400 further optionally can include a block 430 of receiving, from a user device associated with a user, a request for information about the item. The user can be similar or identical to user 350 (FIG. 3). The user device can be similar or identical to user device 340 (FIG. 3). As an example a user can use a web browser or mobile application to view a homepage provided by web server 320 (FIG. 3). At the home page, the user can search for "cell phones." As another example, at the home page, the user can navigate a taxonomy of item categories to view iPhones. As yet another example, the user can additionally click to open an item page for a specific iPhone item.

In a number of embodiments, method 400 additionally can include a block 435 of generating a webpage comprising the new value. The webpage can be a webpage provided by web server 320 (FIG. 3). The webpage can be generated based on the request received in block 430. For example, an item page can display the color of the item as being "matte black." In some cases, various downstream systems, e.g., the Shelf system, the Facets system, the BV system, and/or other suitable systems, can be involved in generating at least portions of the webpage. In other embodiments, the generation of the webpage can be based on the new value, without displaying the new value on the webpage. For example, the color value can be used in generating results of a filtering operation.

In several embodiments, method 400 further can include a block 440 of sending the webpage to the user device for display on the user device. For example, the webpage generated in block 435 can be delivered to the user device for display on a browser or mobile application of the user.

Returning to FIG. 3, in several embodiments, communication system 311 can at least partially perform block 415 (FIG. 4) of receiving a new value associated with an attribute of the attributes for an item of the items.

In several embodiments, content catalog system 312 can at least partially perform block 405 (FIG. 4) of providing a content catalog for items.

In a number of embodiments, source ranking system 313 can at least partially perform block 410 (FIG. 4) of tracking source rankings for the content providers for item categories.

In several embodiments, priority scoring system 314 can at least partially perform block 420 (FIG. 4) of generating a priority score for the new value based on a set of input features associated with the new value and a set of score weightings associated with the set of input features.

In a number of embodiments, merge system 315 can at least partially perform block 425 (FIG. 4) of overriding an existing value of the values in the content catalog associated with the attribute with the new value based on a comparison of the priority score for the new value exceeding a priority score for the existing value.

In a number of embodiments, web server 320 can at least partially perform block 430 of receiving, from a user device associated with a user, a request for information about the item, block 435 (FIG. 4) of generating a webpage comprising the new value, block 440 (FIG. 4) of sending the webpage to the user device for display on the user device, and/or block 440 (FIG. 4) of sending the webpage to the user device for display on the user device.

In many embodiments, the techniques described herein can provide a practical application and several technological improvements. Specifically, the techniques described herein can provide for automatic strategic updates of a content catalog using content provider rankings and confidence scoring, which can allow existing content to be updated when new content will be better, such as more relevant or more accurate. In several embodiments, the techniques described herein can provide a generic approach that can be used for any type of content, with dynamic handling of whether to use the new content based on multiple dynamic factors.

In a number of embodiments, the techniques described herein can be used at a scale that cannot feasibly be handled manually. For example, the number of distinct values being updated daily using the techniques described herein can exceed hundred, thousands, tens of thousands, or more.

In a number of embodiments, the techniques described herein can solve a technical problem that arises within the realm of computer networks, as the handling of attributes and values for an online catalog does not arise outside the realm of computer networks, let alone the updating of such content in an automated manner. Moreover, the techniques described herein can solve a technical problem that cannot be solved outside the context of computer networks. For example, the automatic updates cannot be performed outside the context of computer networks.

Various embodiments can include a system including one or more processors and one or more non-transitory computer-readable media storing computing instructions configured to run on the one more processors and perform certain acts. The acts can include providing a content catalog for items. The content catalog can include attributes for the items, values associated with the attributes, content provider identifiers of content providers that provided the values, and confidence scores for the values. The acts also can include tracking source rankings for the content providers for item categories. The acts additionally can include receiving a new value associated with an attribute of the attributes for an item of the items. The new value can be provided by a content provider of the content providers. The acts further can include generating a priority score for the new value based on a set of input features associated with the new value and a set of score weightings associated with the set of input features. The set of input features can include (a) a source ranking of the source rankings for the content provider for an item category of the item categories associated with the item and (b) a confidence score for the new value. The acts additionally can include overriding an existing value of the values in the content catalog associated with the attribute with the new value based on a comparison of the priority score for the new value exceeding a priority score for the existing value.

A number of embodiments can include a method being implemented via execution of computing instructions configured to run at one or more processors and stored at one or more non-transitory computer-readable media. The method can include providing a content catalog for items. The content catalog can include attributes for the items, values associated with the attributes, content provider identifiers of content providers that provided the values, and confidence scores for the values. The method also can include tracking source rankings for the content providers for item categories. The method additionally can include receiving a new value associated with an attribute of the attributes for an item of the items. The new value can be provided by a content provider of the content providers. The method further can include generating a priority score for the new value based on a set of input features associated with the new value and a set of score weightings associated with the set of input features. The set of input features can include (a) a source ranking of the source rankings for the content provider for an item category of the item categories associated with the item and (b) a confidence score for the new value. The method additionally can include overriding an existing value of the values in the content catalog associated with the attribute with the new value based on a comparison of the priority score for the new value exceeding a priority score for the existing value.

Although automatic strategic updates of a content catalog using content provider rankings and confidence scoring has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders. As another example, the systems within system 300 in FIG. 3 can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable media storing computing instructions configured to run on the one or more processors and perform:
   providing a content catalog for items available for purchase on an e-commerce website, the content catalog comprising the items, attributes for the items, values associated with the attributes in attribute-value pairs for the items, content provider identifiers of content providers that provided the values in the attribute-value pairs for the items, and confidence scores for the values in the attribute-value pairs for the items;
   tracking source rankings for the content providers separately by item categories of the items, such that a first source ranking of the source rankings for a content provider of the content providers for a first item category of the item categories is different from a second source ranking of the source rankings for the content provider for a second item category of the item categories that is different from the first item category;
   receiving a new value to be associated with an attribute of the attributes in an attribute-value pair of the attribute-value pairs for an item of the items, the new value being provided by the content provider;
   generating a priority score for the new value based on a set of input features associated with the new value and a set of score weightings associated with the set of input features, the set of input features comprising (a) a dynamic source ranking of the source rankings for the content provider for an item category of the item categories in which the item is classified and (b) a confidence score for the new value, wherein the confidence score for the new value is either assigned by the content provider or assigned based on a type of the content provider; and
   overriding an existing value of the values in the content catalog associated with the attribute for the item with the new value based on a comparison of the priority score for the new value exceeding a priority score for the existing value,
   wherein:
   the set of input features further comprise an offer status of the new value; and
   a first weighting of the set of score weightings associated with the dynamic source ranking and a second weighting of the set of score weightings associated with the confidence score are each greater than a third weighting of the set of score weightings associated with the offer status.

2. The system of claim 1, wherein the set of input features further comprise a timestamp of at latest update of the new value and a quality score of the new value.

3. The system of claim 1, wherein the third weighting of the set of score weightings associated with the offer status is greater than each of a fourth weighting of the set of score weightings associated with the timestamp and a fifth weighting of the set of score weightings associated with the quality score.

4. The system of claim 1, wherein the priority score for the existing value is generated and the comparison is performed on a same day.

5. The system of claim 1, wherein the content provider for the new value is a seller of the item.

6. The system of claim 1, wherein the content provider for the new value is a machine learning algorithm that generated the new value.

7. The system of claim 6, wherein a category specialist performs a review of information generated by the machine learning algorithm to check the information for validity and adjusts the confidence score based on the review.

8. The system of claim 1, wherein:
   a subset of the content providers are grouped together in a first group; and
   a source ranking of the source rankings for each of the content providers in the first group is identical for the first item category of the item categories.

9. The system of claim 1, wherein the computing instructions are further configured to perform:
   receiving, from a user device associated with a user, a request for information about the item;
   generating a webpage comprising the new value; and
   sending the webpage to the user device for display on the user device.

10. The system of claim 1, wherein the confidence score for the new value is assigned to a default value based on the type of the content provider being a vendor.

11. A method being implemented via execution of computing instructions configured to run at one or more processors and stored at one or more non-transitory computer-readable media, the method comprising:
providing a content catalog for items available for purchase on an e-commerce website, the content catalog comprising the items, attributes for the items, values associated with the attributes in attribute-value pairs for the items, content provider identifiers of content providers that provided the values in the attribute-value pairs for the items, and confidence scores for the values in the attribute-value pairs for the items;
tracking source rankings for the content providers separately by item categories of the items, such that a first source ranking of the source rankings for a content provider of the content providers for a first item category of the item categories is different from a second source ranking of the source rankings for the content provider for a second item category of the item categories that is different from the first item category;
receiving a new value to be associated with an attribute of the attributes in an attribute value-pair of the attribute-value pairs for an item of the items, the new value being provided by the content provider;
generating a priority score for the new value based on a set of input features associated with the new value and a set of score weightings associated with the set of input features, the set of input features comprising (a) a dynamic source ranking of the source rankings for the content provider for an item category of the item categories in which the item is classified and (b) a confidence score for the new value, wherein the confidence score for the new value is either assigned by the content provider or assigned based on a type of the content provider; and
overriding an existing value of the values in the content catalog associated with the attribute in the attribute-value pair for the item with the new value based on a comparison of the priority score for the new value exceeding a priority score for the existing value,
wherein:
the set of input features further comprise an offer status of the new value; and
a first weighting of the set of score weightings associated with the dynamic source ranking and a second weighting of the set of score weightings associated with the confidence score are each greater than a third weighting of the set of score weightings associated with the offer status.

12. The method of claim 11, wherein the set of input features further comprise a timestamp of at latest update of the new value and a quality score of the new value.

13. The method of claim 11, wherein the third weighting of the set of score weightings associated with the offer status is greater than each of a fourth weighting of the set of score weightings associated with the timestamp and a fifth weighting of the set of score weightings associated with the quality score.

14. The method of claim 11, wherein the priority score for the existing value is generated and the comparison is performed on a same day.

15. The method of claim 11, wherein the content provider for the new value is a seller of the item.

16. The method of claim 11, wherein the content provider for the new value is a machine learning algorithm that generated the new value.

17. The method of claim 16, wherein a category specialist performs a review of information generated by the machine learning algorithm to check the information for validity and adjusts the confidence score based on the review.

18. The method of claim 11, wherein:
a subset of the content providers are grouped together in a first group; and
a source ranking of the source rankings for each of the content providers in the first group is identical for the first item category of the item categories.

19. The method of claim 11 further comprising:
receiving, from a user device associated with a user, a request for information about the item;
generating a webpage comprising the new value; and
sending the webpage to the user device for display on the user device.

20. The method of claim 11, wherein the confidence score for the new value is assigned to a default value based on the type of the content provider being a vendor.

* * * * *